Sept. 11, 1934.   R. MERKL   1,973,382
SHADE OPERATING DEVICE FOR AUTOMOBILES
Filed Nov. 6, 1931
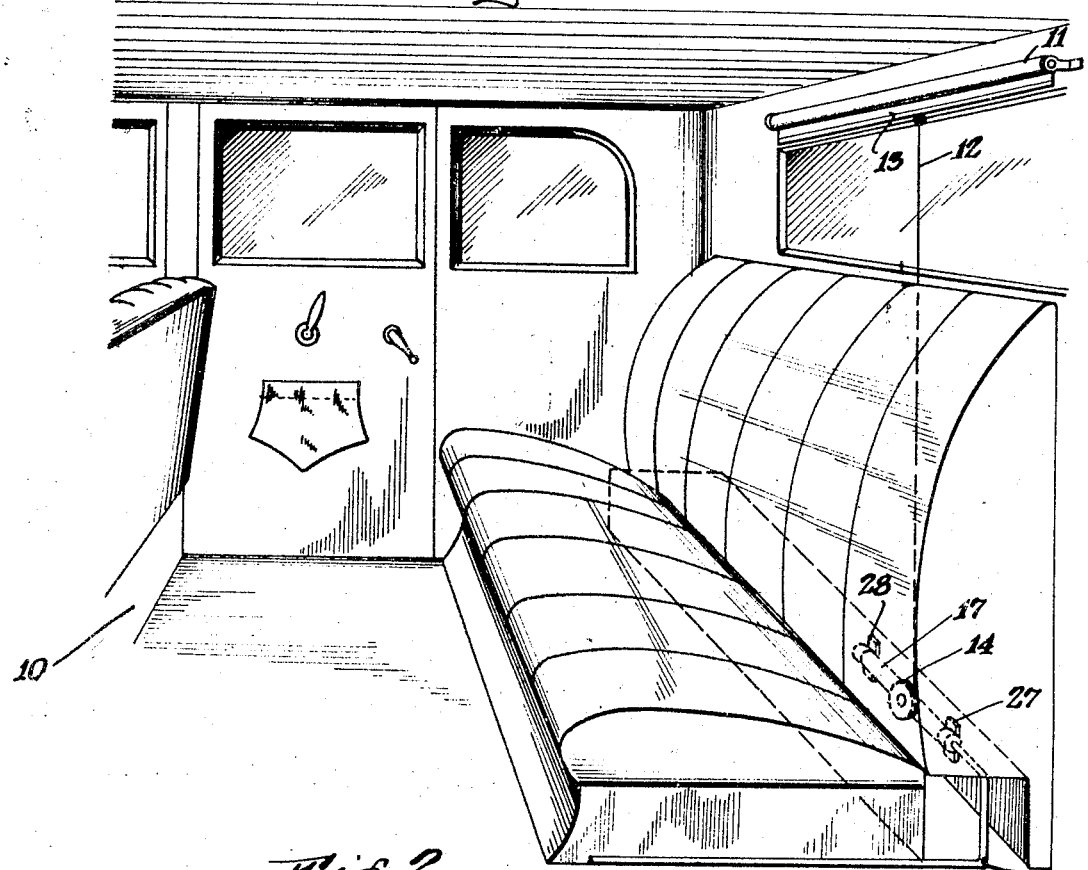
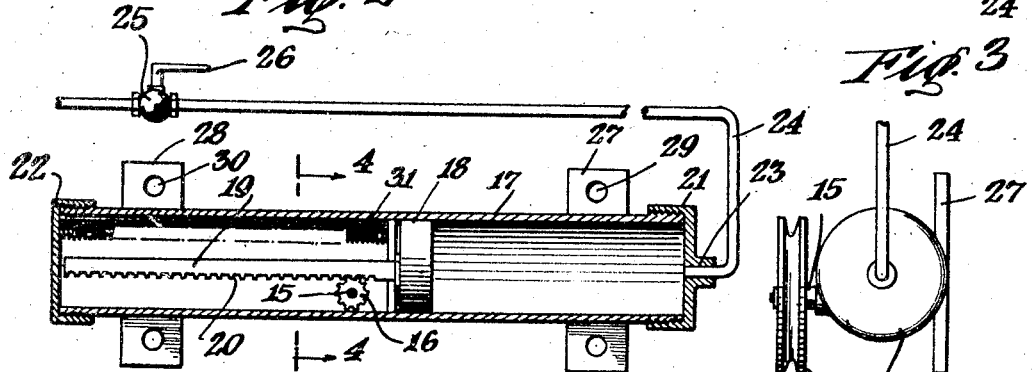
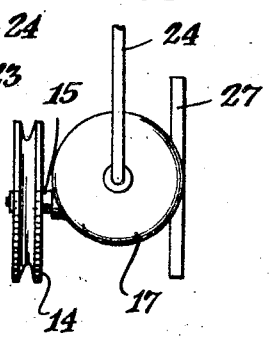
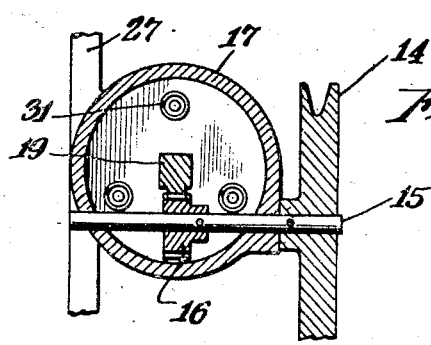
INVENTOR
Rupert Merkl
BY
George C. Heinrich
ATTORNEY Patented Sept. 11, 1934

1,973,382

UNITED STATES PATENT OFFICE 1,973,382

SHADE OPERATING DEVICE FOR AUTOMOBILES

Rupert Merkl, Ossining, N. J.

Application November 6, 1931, Serial No. 573,401

1 Claim. (Cl. 156—28)

This invention relates to improvements in certain or shade operating means, particularly in the means for operating the curtains in automobiles, and it is the principal object of my invention to provide a piston adapted to be operated by suction or compressed air within a suitable cylinder for rotating a pulley to which the shade roller curtain cord is attached and for controlling the supply of the operating medium by the operator of the automobile.

Another object of my invention is the provision of a rack on the rod of the piston in mesh with a gear, the rotation of which operates the pulley to which the shade cord is attached and combined with means for controlling the shade operation by means of an element within convenient reach of the driver, in order to allow a lowering of the rear curtain of an automobile to prevent the glare from irritating the driver and thereby to prevent accidents.

A further object of my invention is the provision of a device of this character which is simple and comparatively inexpensive in its construction, yet durable and highly efficient in its operation.

A still further object of my invention is the provision of a shade operating device of the above described construction in which a spring within the cylinder assists the usual shade roller spring in winding the shade upon its roller if desired, upon the shutting off of the power operating the piston and pulley.

These and other objects and advantages of my invention will become more fully known as the description thereof proceeds, and will then be specifically defined in the appended claim.

In the accompany drawing forming a material part of this disclosure:

Fig. 1 shows part of the interior of an automobile equipped with a curtain or shade operating device, constructed according to my invention.

Fig. 2 is a longitudinal section through the operating cylinder.

Fig. 3 is an end view thereof.

Fig. 4 is a cross-section on line 4—4 of Figure 2.

As illustrated, an automobile 10, of any conventional type has a rear curtain 11, on the usual shade roller adapted to be operated by means of the cord 12 secured at one end to the shade 13 and guided over a pulley 14 to which the other end of the cord is attached.

The pulley is secured to a shaft 15 on which is provided a gear wheel 16 within a cylinder 17, in which a piston 18 is reciprocating under the action of compressed air or by suction. Connected to piston 18 is its rod 19 provided with the rack teeth 20 in mesh with gear 16.

The ends of the cylinder are closed by caps 21, 22, the former provided with a nipple 23 for the attachment of a pipe 24 leading to a compressed air tank or suction element and controlled by a three-way valve 25, the handle 26 of which is within convenient reach of the operator.

Brackets 27, 28, attached to cylinder 17 are provided with suitable openings 29, 30, respectively, for the passage of suitable fastening means for securing the cylinder 17 to the car.

Expansion springs 31 disposed in the cylinder as shown in Figures 2 and 4 and each attached at one end to the piston and at its other end to the cap 22 serve to urge the piston towards its normal position and rotate the shaft and pulley in a direction to unwind the cord and allow the spring roller to roll the curtain to a raised position when the valve is moved to a position shutting off the supply of compressed air and allowing escape of air from the cylinder as the piston is moved by the springs.

The device operates as follows:

When it is desired to draw the rear shade the valve 25 is opened to establish communication through the pipe between the source of pressure and the cylinder and cause the piston to be moved longitudinally of the cylinder in opposition to action of the springs 31. During this movement the shaft and pulley will be rotated and the cord wound upon the pulley to draw the shade. When it is desired to raise the shade the valve is moved to a closed position in which flow of air to the cylinder is cut off and air is permitted to escape through the usual side port of the valve. The springs 31 can then act upon the piston to return it to its normal position and rotate the shaft and pulley in a direction to unwind the cord and permit the spring roller to rewind the shade and return it to its raised position.

It will be understood that I have described and shown the preferred form of my device only as one example of the many possible ways to practically construct the same, and that I may make such changes in its general arrangement and in the construction of the minor details thereof as come within the scope of the appended claims without departure from the spirit of my invention and the principles involved.

Having thus described my invention, what I claim as new and desire to secure by Letters Patent is:

In a device for operating the shade and roller of an automobile window, a cylinder having means for mounting the same upon a support, heads for ends of said cylinder, a fluid pipe communicating with said cylinder through one head, a valve controlling flow of fluid in said pipe, a piston slidable longitudinally in said cylinder and having a rod extending longitudinally in the cylinder and formed with rack teeth, a rotary shaft extending transversely through the cylinder and journaled through the walls thereof with one end portion extending outside the cylinder, the portion of the shaft within the cylinder extending in crossed relation to the piston rod, a pulley carried by the outer end portion of said shaft, a cord wound upon said pulley for drawing the shade when the pulley is rotated in one direction, a pinion mounted upon said shaft within the cylinder meshing with teeth of the piston rod to rotate the shaft and pulley when the piston moves longitudinally in the cylinder, and spring means in said cylinder between the piston and the other head of the cylinder yieldably resisting movement of the piston out of a position in which the cord is unwound from the pulley and the shade raised.

RUPERT MERKL.